(12) United States Patent
Simula et al.

(10) Patent No.: US 8,555,349 B2
(45) Date of Patent: Oct. 8, 2013

(54) METHOD AND APPARATUS FOR SMALL FOOTPRINT CLIENTS FOR OPERATOR-SPECIFIC SERVICE INTERFACES

(75) Inventors: Kirsti Anitta Simula, Kiviniemi (FI); Kaisa Karoliina Nikula, Kello (FI); Antti Forstadius, Espoo (FI)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 12/944,307

(22) Filed: Nov. 11, 2010

(65) Prior Publication Data
US 2012/0124647 A1 May 17, 2012

(51) Int. Cl.
H04L 29/06 (2006.01)

(52) U.S. Cl.
USPC ............................................. 726/4

(58) Field of Classification Search
USPC ............................................. 726/4
See application file for complete search history.

(56) References Cited

U.S. PATENT DOCUMENTS

| | | | |
|---|---|---|---|
| 5,463,620 A | | 10/1995 | Sriram |
| 6,122,483 A * | | 9/2000 | Lo et al. ........................ 455/12.1 |
| 6,704,885 B1 | | 3/2004 | Salas-Meza et al. |
| 7,505,762 B2 | | 3/2009 | Onyon et al. |
| 2003/0159072 A1 * | | 8/2003 | Bellinger et al. ............ 713/202 |
| 2003/0217078 A1 | | 11/2003 | Carlson et al. |
| 2004/0235523 A1 | | 11/2004 | Schrire et al. |
| 2007/0250645 A1 | | 10/2007 | Meadows et al. |
| 2009/0011758 A1 * | | 1/2009 | Aoki et al. ................. 455/432.1 |
| 2009/0307284 A1 | | 12/2009 | Welingkar et al. |
| 2010/0035543 A1 * | | 2/2010 | Nishida ........................ 455/12.1 |
| 2010/0298010 A1 | | 11/2010 | Roth et al. |
| 2011/0276645 A1 * | | 11/2011 | Andersson et al. ........... 709/206 |

FOREIGN PATENT DOCUMENTS

WO  WO 2004/023306 A2  3/2004

* cited by examiner

*Primary Examiner* — Michael S McNally
(74) *Attorney, Agent, or Firm* — Ditthavong Mori & Steiner, P.C.

(57) ABSTRACT

Techniques for small footprint operator-specific network services include determining to obtain and/or process operator data that indicates an operator of a service associated with user equipment. The techniques also include determining to obtain and/or process user data that identifies a user of the user equipment for a gateway provider different from the operator and different from the user. The techniques further include determining to send, to the gateway provider through the communications network, a first message that indicates the operator data and the user data for obtaining a service with an operator-specific interface. In some embodiments, the first message is sent after a random delay to decentralize traffic at the gateway. In some embodiments, the first message is sent when a predetermined fraction of battery life at the user equipment is sufficient to send the first message.

18 Claims, 10 Drawing Sheets

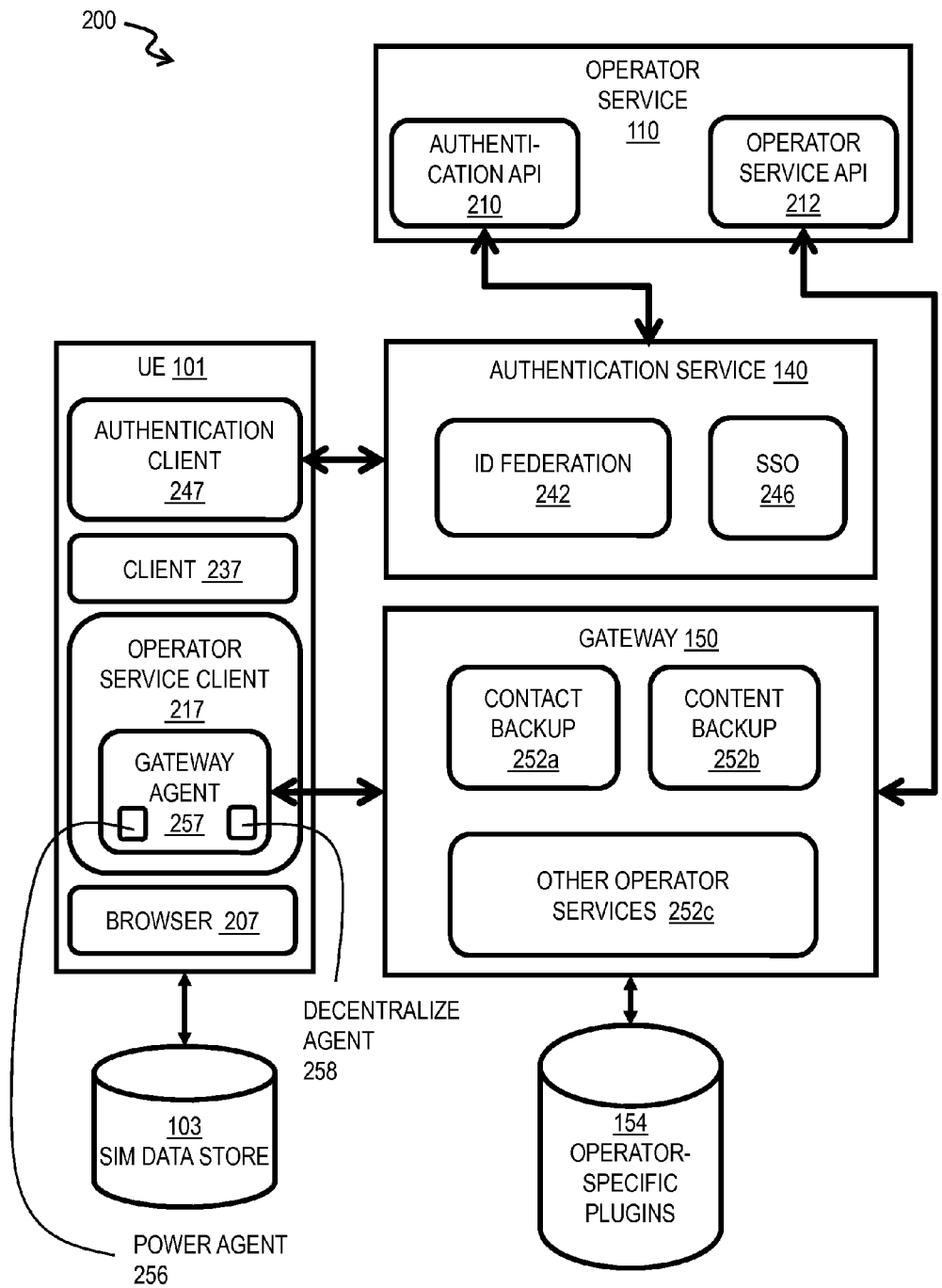

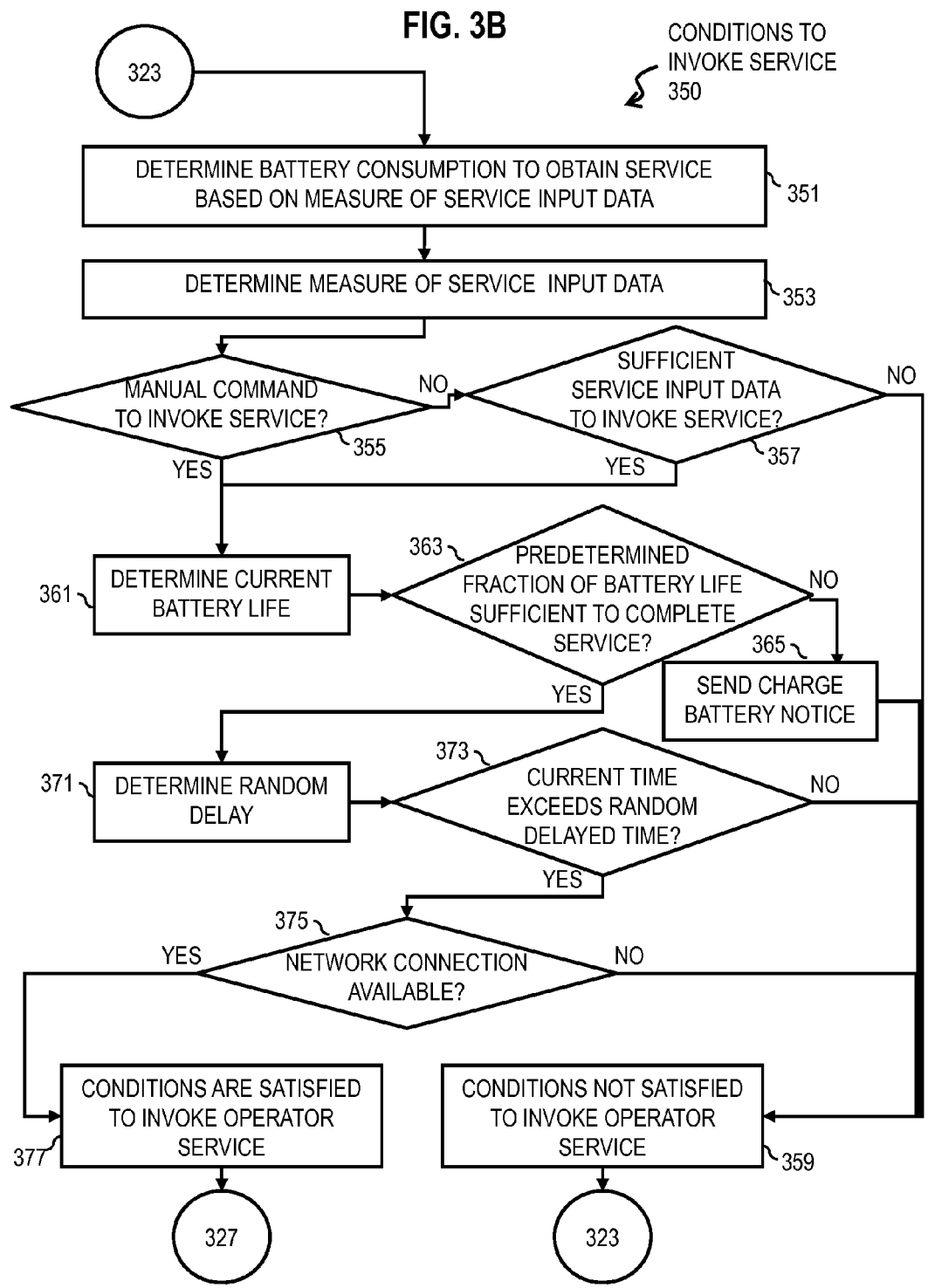

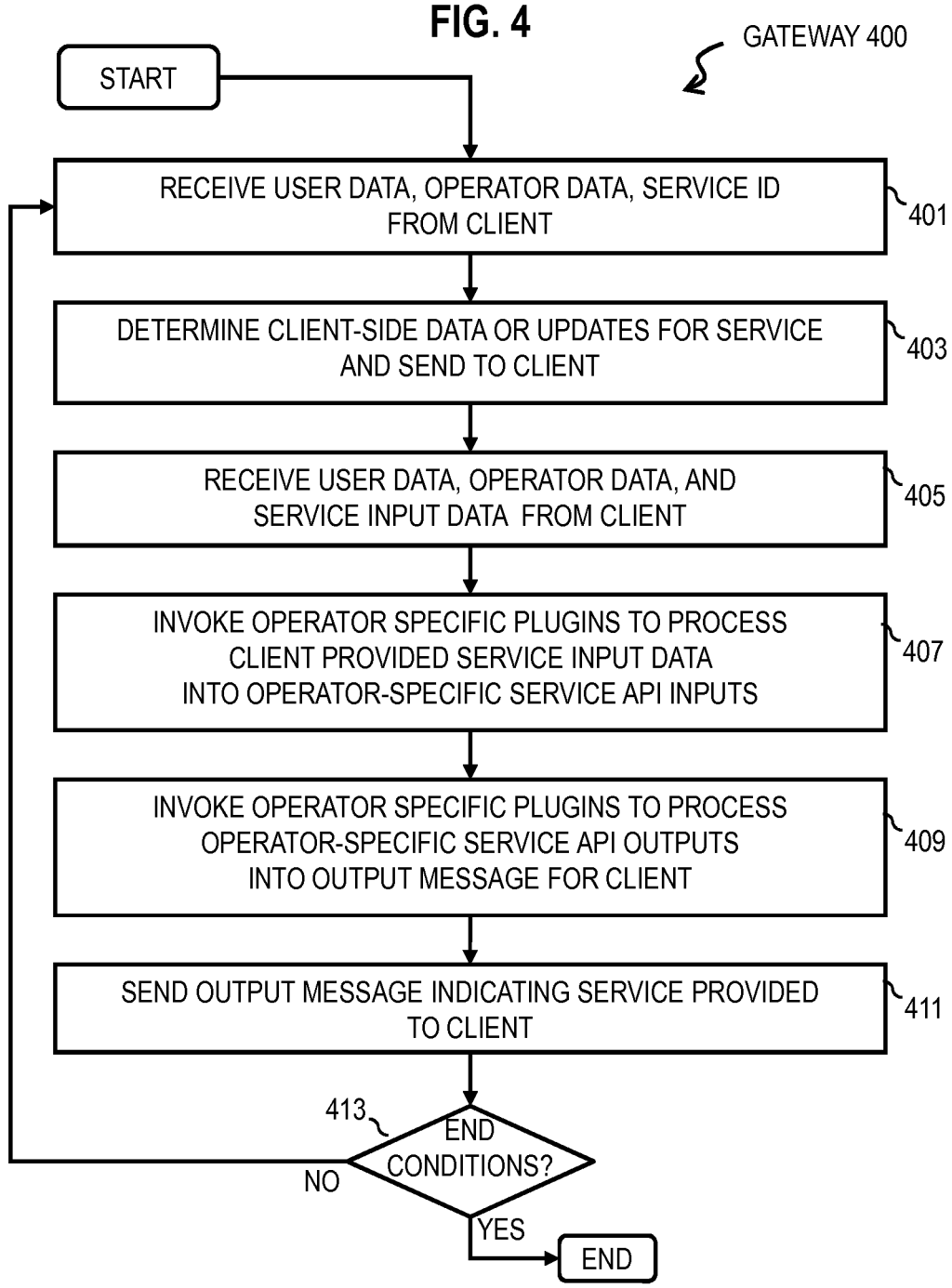

METHOD AND APPARATUS FOR SMALL FOOTPRINT CLIENTS FOR OPERATOR-SPECIFIC SERVICE INTERFACES

BACKGROUND

Service providers and device manufacturers (e.g., wireless, cellular, etc.) are continually challenged to deliver value and convenience to consumers by, for example, providing compelling network services. However, a large fraction of all mobile devices purchased are lost or stolen each year. Either finding their mobile devices or keeping their data, or both, is important to consumers. When a consumer wants to backup his/her personal data (e.g., contacts, short message service messages, call logs, network resource bookmarks, calendar events, notes, installed applications, settings, ring tones, among others, alone or in combination), there are options to backup and retrieve such data on a memory card or personal computer. However, memory cards are not available for all mobile devices; and are often lost when the mobile device is lost. While backup to a personal computer is more widely supported, the latest data is not always synchronized with the personal computer. More network operators are providing such backup and restore services. However, operator-specific interfaces to these services place a burden on the mobile devices and mobile device manufacturers to load the operator-specific variants of such services for many different operators on the same mobile device. Including many operator-specific variants thus imposes a large footprint on the scarce resources available in the typical mobile device.

SOME EXAMPLE EMBODIMENTS

Therefore, there is a need for an approach for supporting small footprint clients for network services with operator-specific interfaces, such as operator-specific interfaces for backup and restore services.

According to one embodiment, a method comprises determining to obtain and/or process operator data that indicates an operator of a service associated with user equipment. The method also comprises determining to obtain and/or process user data that identifies a user of the user equipment for a gateway provider different from the operator and different from the user. The method further comprises determining to send, to the gateway provider, a first message that indicates the operator data and the user data for obtaining a service with an operator-specific interface.

According to another embodiment, a method comprises receiving, at a gateway service, a first message for obtaining a second service with an operator-specific interface from an operator of service associated with user equipment. The gateway service is different from the second service and different from the user equipment. The first message comprises operator data that indicates the operator. The method also comprises determining operator-specific data stored at the gateway service based, at least in part, on the operator data. The method further comprises determining to send, to the second service, a service request message based, at least in part, on the operator-specific data.

According to another embodiment, a method includes facilitating a creation and/or a modification of at least one device user interface element, at least one device user interface functionality, or a combination thereof based, at least in part, on data and/or at least on signal resulting from a local and/or remote receiving, at a first service, a first message for obtaining at least one second service with an operator-specific interface from at least one operator of a service associated with the device. The first service is different from the at least one second service, and the first message comprises operator data that indicates the at least one operator. The method also includes facilitating based on information, data or signal resulting from a local and/or remote determining operator-specific data stored at the first service based, at least in part, on the operator data. The method also includes facilitating based on information, data or signal resulting from a local and/or remote determining to send, to the at least one second service, at least one service request message based, at least in part, on the operator-specific data.

According to another embodiment, a method comprises facilitating access to at least one interface configured to allow access to at least one service, the at least one service configured to perform all or part of one or more of the above methods.

According to another embodiment, an apparatus comprises at least one processor, and at least one memory including computer program code, the at least one memory and the computer program code configured to, with the at least one processor, cause, at least in part, the apparatus to perform all or part of one or more of the above methods.

According to another embodiment, an apparatus comprises means for performing all or part of one or more of the above methods.

According to another embodiment, a computer program product comprises one or more sequences of one or more instructions which, when executed by one or more processors, cause an apparatus to at least perform all or part of one or more of the above methods.

According to another embodiment, a computer-readable storage medium carries one or more sequences of one or more instructions which, when executed by one or more processors, cause, at least in part, an apparatus to perform all or part of one or more of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2A is a diagram of the components of modules that support small footprint clients for network services with operator-specific interfaces, according to one embodiment;

FIG. 3B is a flowchart of process for one step of the process depicted in FIG. 3A, according to one embodiment;

FIG. 4 is a flowchart of a process for a gateway to a network service with operator-specific interfaces, according to one embodiment;

DESCRIPTION OF SOME EMBODIMENTS

Examples of a method, apparatus, and computer program are disclosed for supporting small footprint clients for network services with operator-specific interfaces. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term user refers to, for example, an entity that uses a service or device through a communications network, where an entity can be a person or an organization. A contact refers to, for example, a different user of the service with whom the user communicates through the service. The term subscriber refers to, for example, a user who registers with a service by providing some information about the user, and who is recognized by the service when the user returns to the service. As used herein, the term content refers to any computer-readable data, such as one or more strings of text, contact lists, audio data, images, video clips, documents, spreadsheets, databases, graphs, maps, game data, and computer program instructions. An operator refers to an entity that provides some network service, such as a cell phone service, that is also provided by a different operator; and a third party refers to an entity, such as a cell phone manufacturer, that differs from both the user and the operator.

Although various embodiments are described with respect to backup and restore services for mobile telephone data by operators of mobile telephone networks; it is contemplated that the approach described herein may be used with other services, such as accounting services, customer service services, cloud computing services, among others, alone or in some combination, available from any provider of services associated with mobile or fixed user equipment, wherein similar services are available from different operators with operator-specific interfaces.

Figure 1:
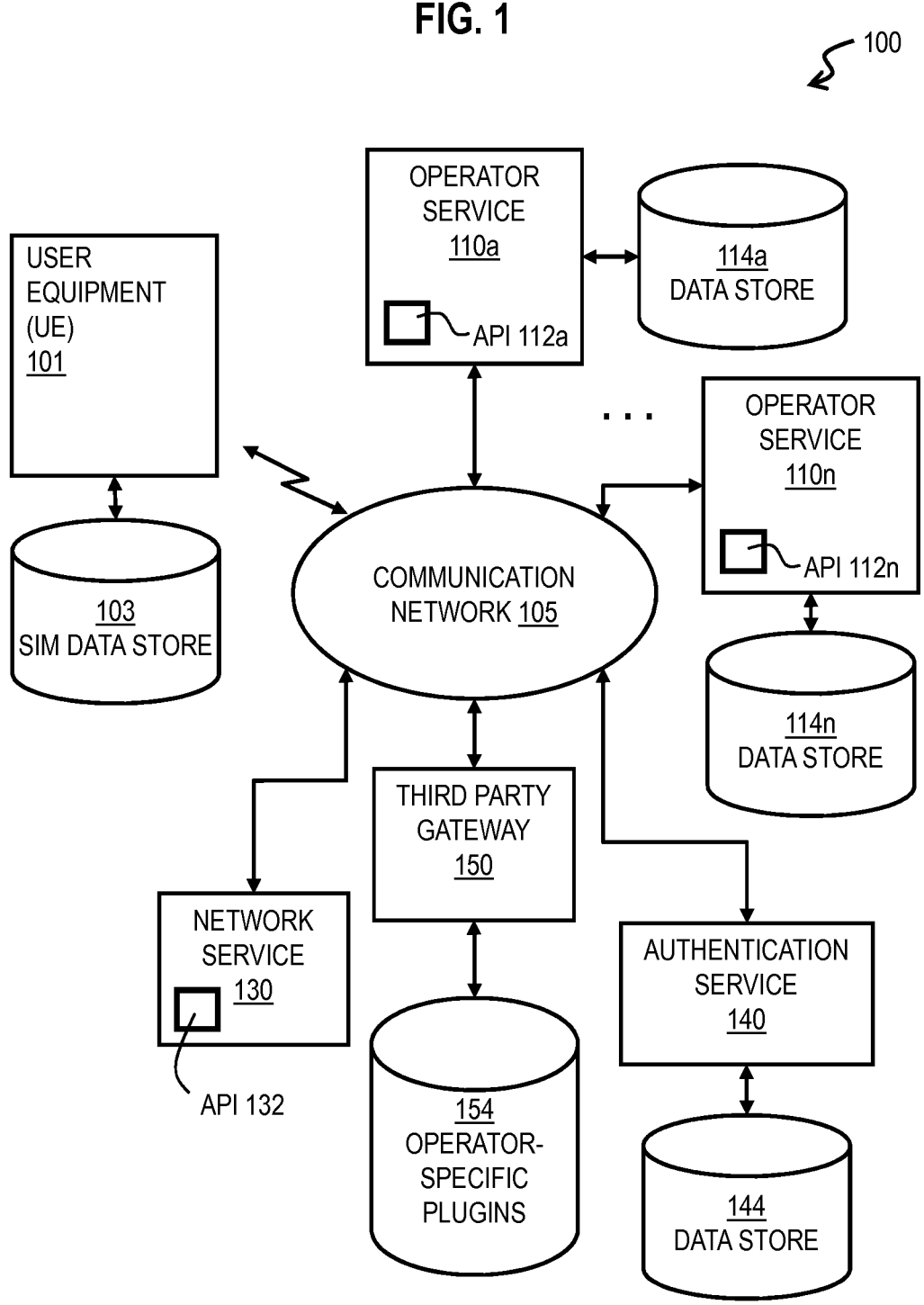
FIG. 1 is a diagram of a system with small footprint clients for network services with operator-specific interfaces, according to one embodiment.

FIG. 1 is a diagram of a system 100 with small footprint clients for network services with operator-specific interfaces, according to one embodiment. A user obtains user equipment (UE) 101 to perform local functions and to communicate across communication network 105 with one or more other users through their user equipment (collectively referenced hereinafter as UE 101) or to communicate with one or more network services, such as network service 130 (collectively referenced hereinafter as network services 130). A user registers the UE 101 with one communication network operator that provides operator equipment for receiving direct communications from the UE 101 and routing those communications to the desired destination through one or more devices called network nodes in the communication network 105.

Multiple network operators each provide one or more services for their subscribers who use registered UE 101. For example, services 110a through 110n (collectively referenced hereinafter as operator services 110) are provided by corresponding multiple different network operators for a particular service, e.g., a service for backing up some or all content on the UE 101 of their subscribers on service data stores 114a through 114n, respectively (collectively referenced hereinafter as data stores 114) or a service for authenticating a user as an actual subscriber based on authentication data stores on data stores 114. The functions of the services 110a through 110n are accessed through corresponding application programming interfaces (APIs) 112a through 112n (collectively referenced hereinafter as API 112). A client process on the UE 101 interacts with the API 112 on the corresponding operator service 110. In many circumstances, the API 112 for the same type of service (e.g., for subscriber content backup and restore services at data stores 114, or for authentication) are different for the different operators. That is, in many circumstances the operator service APIs 112 are operator specific.

Also depicted in FIG. 1 is an API 132 for network service 130 which is not an operator service but provided by some third party different from both the UE 101 and the operators.

For example, contacts backup and restore is becoming one of the key services for operators to reduce churn and increase customer satisfaction. The basic solution is generally based on use of a SyncML engine in the UE 101 which can be configured to interface to operator synchronization backend service 110 for backup and restore of contacts data. In many cases basic contacts sync is not enough to meet consumer needs, as more and more personal content (e.g., photos, messages, application data, among others) is stored primarily on the UE 101. However, any more sophisticated backup and restore service than basic personal information management (PIM) synchronization generally requires a dedicated, operator-specific application to be installed on the device.

The manufacturer of the UE 101 does not always know what operator will be providing access to the communications network 105 for an individual UE 101, and therefore cannot always predict which operator-specific API 112 will be involved for a particular type of service. In prior approaches, the manufacturer installs instructions for a client process for each type of service with multiple operator-specific instruction sets, called plug-ins, or installs multiple operator-specific clients for each service. Thus, when the UE 101 is registered with a particular operator, the correct plug-in or client is available for the UE 101 to correctly interact with the operator-specific API 112. A disadvantage of this approach is that the instruction sets stored in the memory of the UE 101, and the size of the program that executes, becomes large as the number of different operator-specific API grows. Such space is limited on many mobile devices that serve as UE 101. Furthermore, earlier manufactured UE 101 are not able to obtain services from later developed operator-specific API 112, unless new software is installed on the UE 101. Re-installing operator specific plug-ins for widely distributed UE 101 consumes time and network bandwidth.

To address this problem, the system 100 of FIG. 1 introduces a third party gateway service 150 to intervene between the client process on UE 101 and the operator service 110. Then the gateway maintains the operator-specific plug-ins for the various operator provided services on fewer hosts with greater storage and processing capacity. For example, the operator-specific plug-ins are maintained in data structure 154. In some embodiments, different gateways are used for different services. For example, in the illustrated embodiment, an authentication service 140 with data store 144 functions as a gateway for operator-specific authentication service APIs. Thus, the illustrated embodiment addresses the challenge of creating a generic user data backup and restore solution for both device and service backend. This solution provides extended synchronization capabilities towards any final operator backend destination along with transparent mechanism for user authentication. The illustrated embodiment isolates device synchronization client on UE 101 from direct connection with operator backend service 110 by creating a solution where third-party gateway service 150 and authentication service 140 act as proxy/router/authentication for synchronizing content. Thus, a generic solution supports various operator services without changes on the UE device side. Functionality in UE 101 collects the content to be backed up; and sends it via gateway service 150 to the operator network for storage. Restore can be made from the operator backend service 110 directly to the device UE 101 or also through the gateway service 150. The operator plug ins 154 stored at the third party gateway 150 use the operator services APIs (112) and the client on UE 101 uses only the authentication related API and the Third Party gateway API. The operator service APIs (112) are invisible for device client in these embodiments.

In some embodiments, the authentication is very simple. For example, the user of a cellular telephone just types the phone's PIN code; and, as a result, access to the both third-party service 130 and operator service 110 is allowed. The PIN code is the only thing that the user is prompted to input for authentication; and, in some embodiments, only upon first use of the phone. Such embodiments invoke a Single Sign On (SSO) system. One or more clients in UE 101, the gateway service 150 and an authentication API of the operator services 110 manage the authentication so that the user is not prompted to do anything else to obtain the backup and restore service or other operator services with operator-specific interfaces.

Also depicted in FIG. 1 is a Subscriber Identity Module (SIM) data store 103 for UE 101. Many mobile terminals include a SIM, also called a SIM card. A SIM is a portable memory chip used in some models of cellular telephones. The SIM makes it easy to switch to a new phone by simply sliding the SIM out of the old phone and into the new one. The SIM holds personal identity information, cell phone number, phone book, text messages and other data. The SIM is often provided by a network operator from whom a user obtains access to the network for the user equipment; and thus the SIM often indicates the network operator.

As shown in FIG. 1, the system 100 comprises user equipment (UE) 101 having connectivity to operator services 110, and third party network services 130, and gateway service 150 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, operator services 110, and third party network service 130, authentication service 140 and gateway service 150 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, often communicate using the client-server model of network communications, widely known and used. According to the client-server model, a client process sends a message of one or more data packets including a request to a server process, and the server process responds by providing a service. The server process may also return a message of one or more data packets with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" and "service" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most devices (called nodes) connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

Although processes and data structures of system 100 are depicted as integral blocks arranged on particular nodes connected to network 105 for purposes of illustration, in other embodiments, one or more processes or data structures or portions thereof are arranged in a different way or in one or more databases on the same or different nodes, or one or more other processes or data structures are included, or the system is changed in some combination of ways.

FIG. 2A is a diagram of the components 200 of processes that support small footprint clients for network services with operator-specific interfaces, according to one embodiment. By way of example, the processes include one or more components 200 for supporting small footprint clients for network services with operator-specific interfaces. It is contemplated that the functions of these components may be combined in one or more components or performed by other components of equivalent functionality on the same or different hosts, or one or more components are omitted, or one or more additional components are added, or the depicted processes are changed in some combination of ways. In this embodiment, the components of the UE 101, operator service 110, authentication service 140 and gateway service 150 are depicted.

The operator service 110 includes an authentication API 210 and an operator service API 212 for any of one or more services offered by this operator, which parallels similar services offered by other operators. For purposes of illustration, it is assumed that each of authentication API 210 and operator service API 212 are operator specific.

The authentication service 140 interacts with the operator-specific authentication API 210, as indicated by the thick double-headed arrow. In the illustrated embodiment, the authentication service 140 includes an ID federation module 242 and a single sign on (SSO) module 246. The ID federation module provides for sharing user authentication among multiple different service providers, including one or more operators of communications networks. Users can be authenticated by one company or website and be recognized and delivered personalized content and services in other locations without having to re-authenticate or sign on with a separate username and password.

The SSO module 246 provides for a token that expires after a predetermined time. The token is used to verify that a user has been authenticated for multiple services provided by a single provider, such as the third party provider which is different from the UE 101 and the operators of services 110.

The third party gateway service 150 includes a contact backup module 252a, a content backup module 252 and one or more other operator services modules 252c (collectively referenced hereinafter as operator service modules 252). For purposes of illustration, it is assumed each operator service module 252 has a corresponding API. Operator-specific plug-ins for each of these modules are store in operator-specific plug-ins data structure 154. The gateway service 150 interacts with the operator-specific operator service API 212, as indicated by the thick double-headed arrow.

The UE 101 includes a Web browser 207, as described above, a client 217 for an operator service, a client 237 for the network service 130, and an authentication client 247. The Web browser 207 and client 237 are as described above.

The operator service client 217 is a client process for a non-authentication operator service (such as user contact or content backup and restore) and includes a gateway agent module 257. The gateway agent module 257 obtains data to input to the service and sends the data to the third party gateway service 150, as indicated by the thick double-headed arrow. In some embodiments, the gateway agent module 257 includes a power agent module 256 and a decentralize agent module 258. The power agent module 256 determines when to start the invocation of the gateway service 150 based on power consumption considerations. The decentralize module 258 determines when to start the invocation of the gateway service 150 based on avoiding congestion at the hosts of the gateway service 150. The clients 217 on many UE 101 use a single API 252 for a single type of service (e.g., use the single API of module 252a for contact backup and restore), no matter which operator provides network access and actually performs the service (e.g., does the backup and restore).

The authentication client 247 interacts with the authentication service 140, as indicated by the thick double-headed arrow. In the illustrated embodiment, the authentication client includes a user log-in module and a single sign on device enabler (SSO DE) for interacting with the SSO module 246.

Figure 2B:
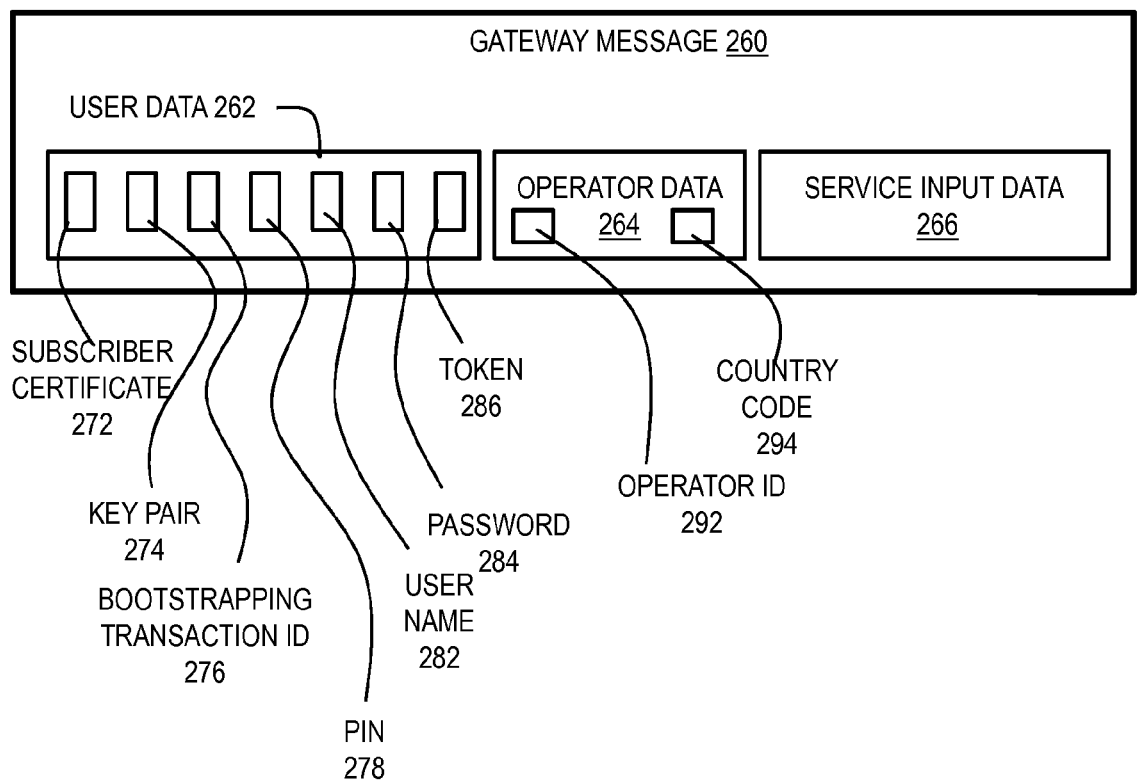
FIG. 2B is a diagram of a gateway message sent from a client, according to one embodiment.

FIG. 2B is a diagram of a gateway message 260 sent from a client, according to one embodiment. The gateway message includes a user data field 262, and operator data field 264 and a service input data field 266.

The user data field 262 includes one or more of a subscriber certificate field 272, a key pair field 274, a bootstrapping transaction identifier (B-TID) field 276, a personal identification number (PIN) field 278, a username field 282, a password field 284, or a token field 286.

The subscriber certificate field 272 holds data that indicates a subscriber certificate assigned during initial registration of a user with the operator and stored on the SIM. Similarly, the key pair field 272 holds data that indicates a public and private key pair assigned during initial registration of a user with the operator and stored on the SIM.

The B-TID field 276 holds data that indicates a value used by some operators to authenticate a user based on data stored on the SIM; and, as data in the first two fields, is assigned during initial registration of a user with the operator and stored on the SIM.

The PIN field 278 holds data that indicates a personal identification number (PIN) supplied by the user; and, as data in the first three fields, is assigned during initial registration of a user with the operator.

The username field 282 holds data that indicates a username used for authentication by some operators. Similarly, the password field 284 holds data that indicates a password used with the username for authentication by some operators.

The token field 286 holds data that indicates a token. The token is assigned by the SSO module and indicates authorization to use at least one service at the gateway provider for a specified time.

The operator data field 264 includes one or more of an operator ID field 292 and a country code field 294. The operator ID field 292 holds data that uniquely indicates a particular operator, at least within a particular value for the country code field 294. The country code field 294 holds data that uniquely indicates a country where the operator is registered to provide one or more network services. Thus, in some embodiments, the operator data further comprises a country identifier and an operator identifier. The country identifier indicates a country where the operator provides a service for user equipments. The operator identifier uniquely identifies the operator within the country.

The service input data field 266 holds data used as input for the operator service, such as a contacts list or other user content to be backed up at a backup and restore service. For embodiments in which the operator service is authentication, the service input data field 266 is omitted and one or more fields in the user data field 262 constitute input data for the service.

Although data messages and fields are depicted in FIG. 2B as integral blocks arranged in a particular order for purposes of illustration, in other embodiments, one or more messages or fields, or portions thereof, are arranged in a different order or one or more other fields are included, or the message is changed in some combination of ways. For example, in some embodiments, the service input data field 266 is omitted.

In some embodiments, the message 260 with certain fields is sent between an authentication client 247 and an authentication service 140. In some embodiments, the message 260 with the same or different fields is sent from authentication client 247 to operator service client 217, or gateway agent 257 within that client, all within UE 101. In some embodiments, the message 260 with the same or different fields is sent from gateway agent 257 to gateway service 150.

Figure 3A:
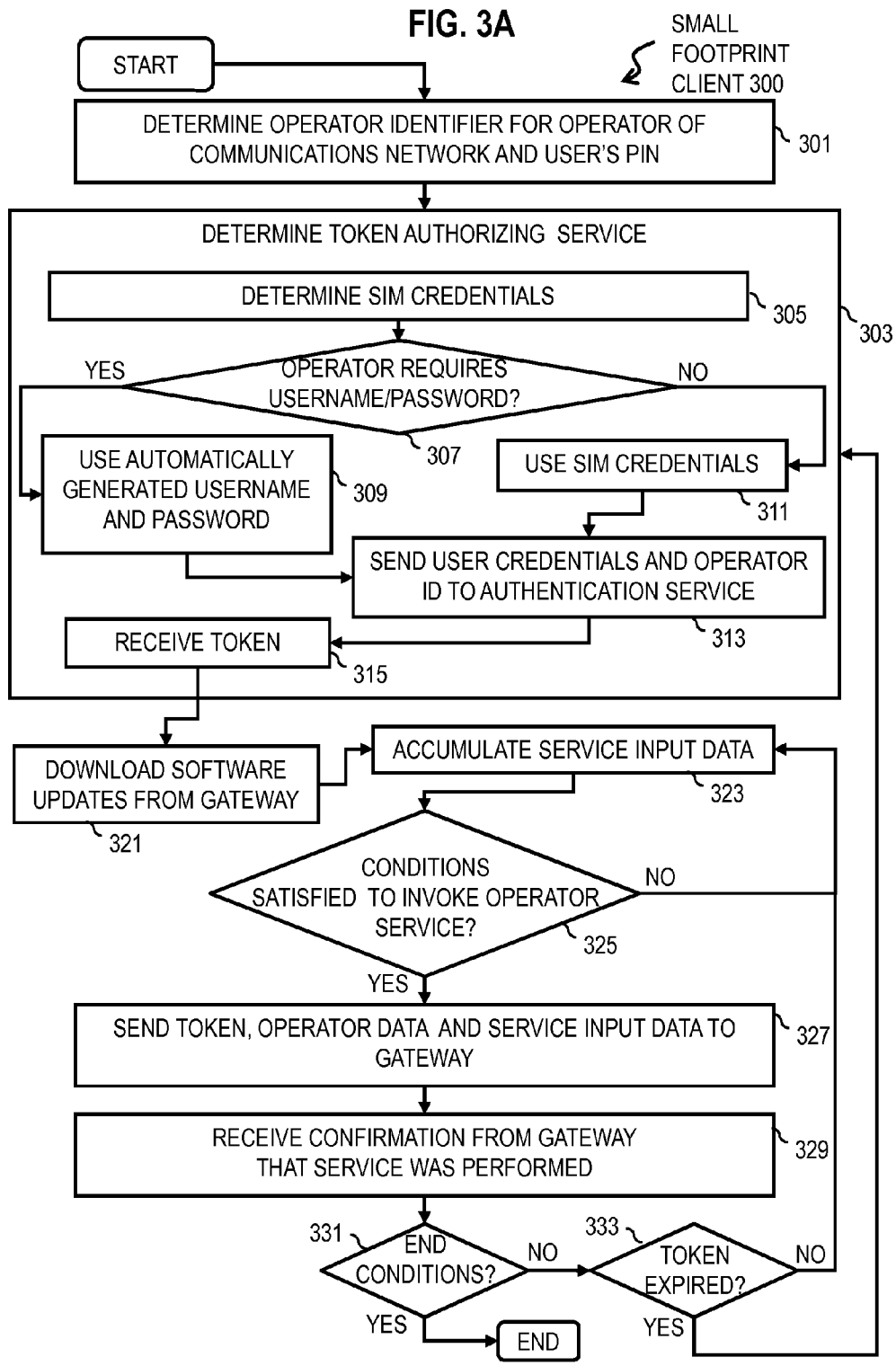
FIG. 3A is a flowchart of a process for a small footprint client, according to one embodiment.
Figure 7:
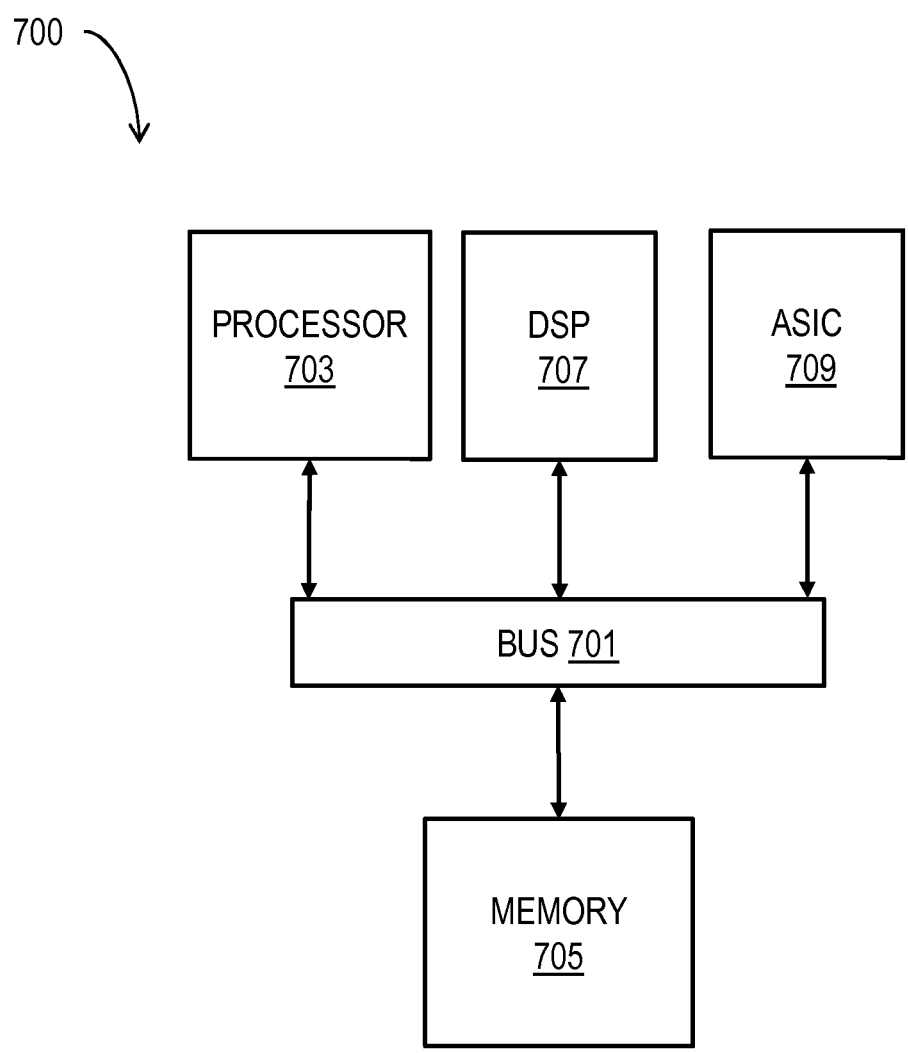
FIG. 7 is a diagram of a chip set that can be used to implement an embodiment of the invention.
Figure 8:
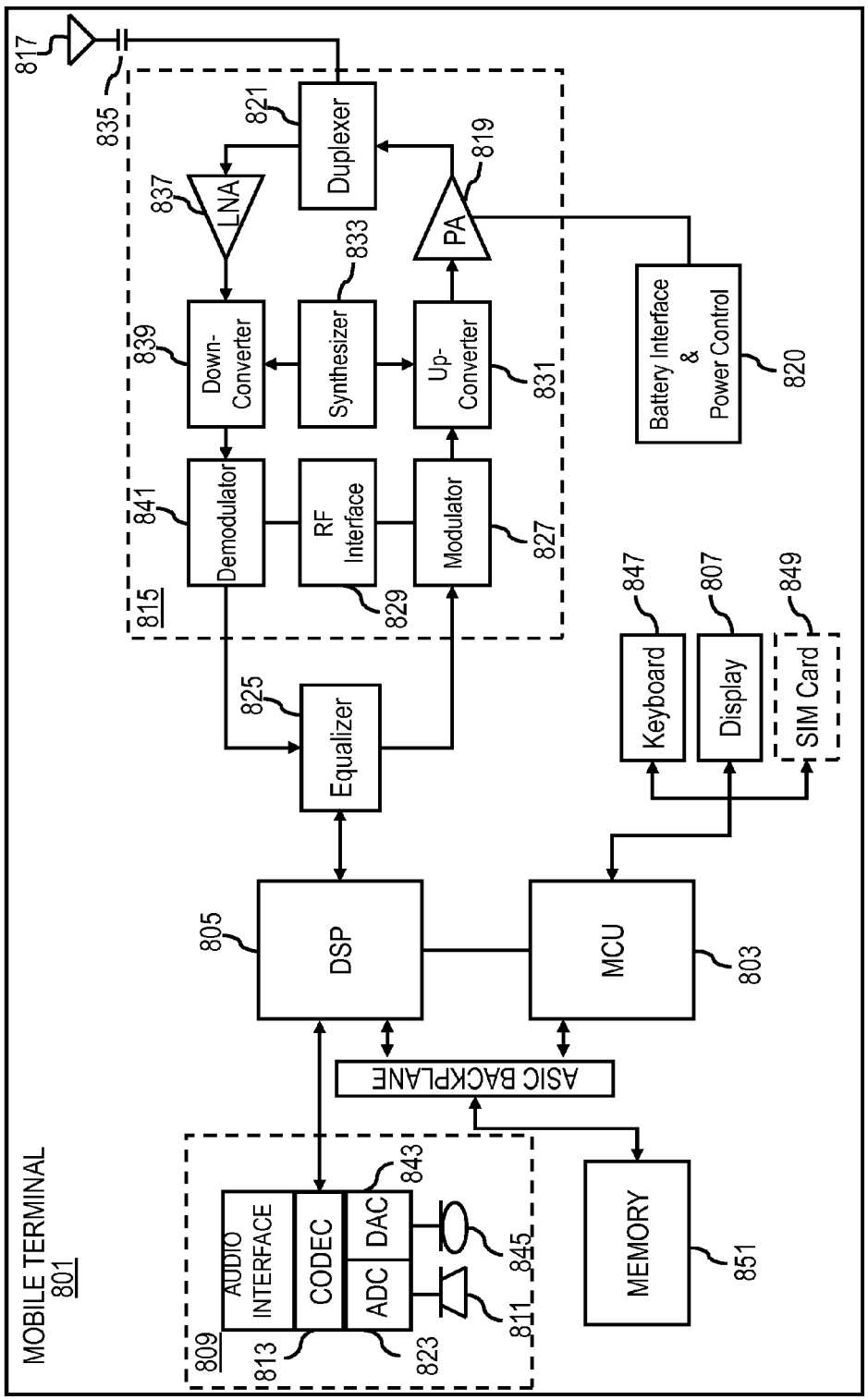
FIG. 8 is a diagram of a mobile terminal (e.g., handset) that can be used to implement an embodiment of the invention.

FIG. 3A is a flowchart of a process for a small footprint client, according to one embodiment. In one embodiment, the gateway agent 257 and authentication client 247 perform the process 300 and are implemented in, for instance, a chip set including a processor and a memory as shown in FIG. 7 or a mobile terminal as depicted in FIG. 8. Although steps are shown in FIG. 3A, and subsequent flow charts FIG. 3B and FIG. 4, as integral blocks in a particular order for purposes of illustration, in other embodiments one or more steps, or portions thereof, are performed in a different order, or overlapping in time, in series or in parallel, or are omitted, or one or more additional steps are included, or the process is changed in some combination of ways In step 301, an identifier for the operator is determined. In the illustrated embodiment, the user's personal identification number (PIN) is also determined during step 301. For example, when the user starts a cell phone (as an example embodiment of UE 101) for the first time, the user enters, through a keyboard or touch screen, the PIN code provided to the user when the user subscribed for service with the operator. Then the authentication client 247 on the cell phone (such as a Cherry client on some cell phones of NOKIA CORPORATION™ of Espoo, Finland) performs ordinary second generation (2G) or third generation (3G) authentication and key agreement (e.g., Authentication and Key Agreement, AKA); and determines a session key. AKA is used to securely authenticate a mobile terminal. All this information is stored on the SIM, to be retrieved for subsequent authentication without further user involvement. Thus step 301 includes determining user data that identifies a user of the user equipment for a gateway provider different from the operator and different from the user.

During step 301, the authentication client 247 gets the International Mobile Subscriber Identity (IMSI) number of the SIM. The IMSI is a unique identification associated with all GSM and UMTS network mobile phone users. The first 3 digits are the Mobile Country Code (MCC), and are followed by the Mobile Network Code (MNC), either 2 digits (European standard) or 3 digits (North American standard). The remaining digits are the mobile station identification number (MSIN) within the network's customer base. The authentication client 247 then checks a Cell ID indicted by a base station of the operator with which the cell phone directly communicates; and determines whether the phone is logged into that same operator's network. Thus step 301 includes determining operator data that indicates an operator of a service associated with user equipment.

In step, 303 a token that authorizes the user to obtain a service from an operator through a third party gateway is determined. In some embodiments, authentication and authorization are not involved, and step 303 is omitted. In the illustrated embodiment, step 303 includes steps 305 through 315.

In step 305 the user's credentials stored on the SIM are determined. Thus step 305 includes determining more user data that identifies a user of the user equipment for a gateway provider. For example, the Cherry client (as an embodiment of a component of authentication client 247) reads a Subscriber certificate with the corresponding key pair, the lifetime of the key pair, and a Bootstrapping Transaction Identifier (B-TID) from the SIM. These data items are stored safely by the authentication client 247 (such as an SSO DE) along with the user provided PIN, the country code and the operator code in a manner to ensure some level of security. If the Bootstrapping Transaction Identifier (B-TID) is not empty, then the operator supports SIM-based authentication, e.g., authentication based on data stored on the SIM. If the Bootstrapping Transaction Identifier (B-TID) is empty, then the operator does not support SIM-based authentication, and a username and password are used instead by the operator for authentication. Thus, in some embodiments, determining operator data further comprises determining to retrieve operator data from local storage at the user equipment. In the illustrated embodiment, the local storage at the user equipment is a subscriber identity module (SIM). In other embodiments other fixed or removable local storage media are used, such as CD, flash drives, and non-volatile memory.

In step 307, it is determined whether the operator requires a username and password or uses SIM-based authentication. For example, it is determined whether the B-TID is empty or not. If the operator requires a username and password (e.g., if B-TID is empty), then in step 309 an automatically generated username and password are used. The automatically generated username and password are retrieved from local storage by the authentication client 247 (e.g., by the SSO DE component of the client 247). If a username and password are not already stored locally, then they are generated automatically, without involvement by the user, and stored locally. For example, an SSO DE component of the authentication client 247 generates a username and password using some commonly available username and password generators. In some of these embodiments, the SSO DE component stores all those parameters in a safe place in the device and at least the password is encrypted. A gateway message 260 for authentication is prepared for sending, with field 266 omitted or holding a null value. For example, the user data field 262 includes the automatically generated username in field 282 and the automatically generated password in field 284. In various embodiments, one or more of the other fields in user data field 262 are omitted or filled with null values. The operator data field 264 includes the country code in field 294 and the operator ID in field 292. A data structure for storing such information would have fields that parallel the fields in user data field 262 and operator data field 264. In this embodiment, also, determining operator data further comprises determining to retrieve operator data from local storage at the user equipment.

In some embodiments, if not already stored, then the user is prompted for them. An advantage of automatically generated username and password is to reduce delays as a user is prompted for input and the input is provided. Using automatically generated username and password is an example means of achieving the advantage of avoiding delays involved in prompting a user to provide them. Thus step 309 includes determining more user data that identifies a user of the user equipment for the gateway provider.

Thus, determining the local data based on a username and a password in step 309 further comprises determining whether the username and password are stored locally at the user equipment. If not, then step 309 includes automatically generating at least one of the username and password.

If it is determined in step 307 that the operator does not require a username and password, but instead supports SIM-based authentication (e.g., if B-TID is not empty), then in step 311 the SIM-based credentials (such as the PIN code, Subscriber certificate and the key pair) are used. A different gateway message 260 for authentication is prepared for sending, with field 266 omitted or holding a null value. For example, the user data field 262 includes data that indicates the subscriber certificate in field 272, data indicating the key pair in field 274, and data indicating the B-TID value in field 276. In various embodiments, one or more of the other fields in user data field 262 are omitted or filled with null values. The operator data field 264 includes the country code in field 294 and the operator ID in field 292. A data structure for storing such information would have fields that parallel the fields in user data field 262 and operator data field 264.

Thus step 307 includes determining whether authentication is based on data retrieved from a subscriber identity module at the user equipment. Step 309 includes determining the local data based on a username and a password at least one of which is automatically generated at the user equipment, if authentication is not based on data retrieved from the subscriber identity module at the user equipment.

In step 313, the authentication client 247 sends the user credentials and operator ID to the authentication service of the third party. For example, if a username and password is used, the SSO DE component sends a gateway message 260 with data indicating the country code and operator code in fields 294 and 292, respectively, and data indicating the generated username and password in fields 282 and 284, respectively. The gateway message 260 is sent to the API of SSO module 246 of the authentication service 140, which stores all parameters excluding the password. On the contrary, if SIM-based authentication is used, the SSO DE component sends a different gateway message 260 with data indicating the country code and operator code in fields 294 and 292, respectively, and data indicating the subscriber certificate, key pair, B-TID and PIN in fields 272, 274, 276 and 278, respectively. The gateway message 260 is sent to the API SSO module 246 of the authentication service 140, which stores all parameters. A data structure for storing such information would have fields that parallel the fields in user data field 262 and operator data field 264. Thus, during authentication, step 313 includes determining to send, to the gateway provider, a first message that indicates the operator data and the user data for obtaining a service with an operator-specific interface.

In step 315, the authentication client 247 receives and stores the token. For example, the API of SSO module 246 returns the access token to the SSO DE component of the authentication client 247, which stores the token in association with the related parameters that are already stored. A data structure for storing such information would have fields that parallel the fields in user data field 262 and operator data field 264.

In some embodiments, the token data, e.g., indicated in field 286, serves as the user data. In such embodiments, determining the user data further comprises determining to send, to the gateway provider through the communications network, an authentication message; and receiving from the gateway provider token data in response to the authentication message. The authentication message indicates the operator data and local data, including local data retrieved from the SIM or locally generated and locally stored username and password data. When the data retrieved from the SIM is used, determining to send the authentication message further comprises determining the local data based, at least in part, on data retrieved from a subscriber identity module at the user equipment. The token data indicates authorization to use at least one service at the gateway provider for a specified time. In some embodiments that include the user-provided PIN in the authentication message, determining to send the authentication message further comprises determining the local data based, at least in part, on data received at the user equipment as input from the user of the user equipment.

In step 321, software updates are downloaded from the gateway. For example, operator service client 217 is activated on the UE 101 and opens a user interface portion of a screen on the UE 101, such as user interface for backup and restore of contacts and content for the user. Gateway agent 257 forms a gateway message 260 with the token in field 286, the operator ID in field 292, the country code in field 294, and data indicating the service in field 266 (such as data indicating a particular API 252 of gateway service 150). Thus, in step 321, the first message further comprises data that indicates the service with an operator-specific interface. This message 260 is sent to the gateway service 150. In response, the gateway returns any software updates for the operator service client 217, including any logos for the operator or specials or other advertisements for display in the user interface on UE 101. In response, the operator service client 217 executes the updated software with any updated display data. Thus, the downloads include operator-specific branding and possible modifications to existing apps, new widgets etc. The gateway agent 257 calls an application installer module on the UE 101 to install those possible additions. Now the user can see both operator and third party services in the user interface, such as a home screen, with possible operator branding.

In step 323, service input data is accumulated. For example, the contacts or content, or both, to be backed up are retrieved from local storage and queued up in one or more messages for sending to the gateway. In some embodiments, user input is acquired during step 323 to indicate the service data to accumulate. For example, the user indicates content to be backed up automatically and a schedule for backups, or manually indicates particular content to be backed up at a particular time. The backup and restore client 217 collects the data from different sources (for example, applications that are backup enabled store their data). It is assumed for purposes of illustration that timelines (e.g., SMS messages, multimedia message service (MMS) messages, call logs, instant messenger (IM) messages) and photos are also backed up. It is anticipated that user input can dynamically indicate new data types for backup. In some embodiments, to save bandwidth, only changed data is backed up; and if no changes, then no data is accumulated.

In step 325, it is determined whether conditions are satisfied to invoke the operator service, such as whether enough changed data has been accumulated to warrant calling the operator backup service. In an illustrated embodiment, the conditions to be satisfied include amount of data, battery power, and time since last backup, as described in more detail below with reference to FIG. 3B. If it is determined in step 325 that conditions to invoke the operator service are not satisfied, then control returns to step 323 to accumulate service input data.

Otherwise, in step 327, a gateway message that includes the token, the operator data and the service input data is sent to the gateway. For example, gateway message 260 is sent with data indicating the token in field 286, data indicating the operator ID in field 292 and the country code in field 294, and data indicating the contact backup and restore service API 252a and the accumulated contacts to be backed up in field 266. Thus in non-authenticating embodiments, step 327 includes determining to send, to the gateway provider, a first message that indicates the operator data and the user data for obtaining a service with an operator-specific interface. The first message further comprises input data for the service. In the illustrated embodiment, the service with an operator-specific interface includes a service to backup and restore data for the user equipment by the operator.

In step 329 confirmations is received that the service is performed. For example, based on the operator data, the API for the gateway's contact backup module 252a applies the corresponding operator-specific plug-in for the service, and processes the service input data in field 266 into a form appropriate for the operator-specific service API 212. The API 212 indicates when the service is complete and that result is returned to the content backup module 252a, where it is returned to the operator service client 217 on UE 101. In some embodiments, on the device side there is a third party notification client, as part of gateway agent 257, that sends and receives notifications from the gateway backend handled by a third party notification engine concerning changes to the backed up/restored data. The notification client causes the result to be presented to the user. Thus, in some embodiments, the method further includes determining to present, on the user equipment, data received from the gateway provider in response to the first message.

In step 331, it is determined if end conditions are satisfied. If so, then the process ends. For example, if all operator service clients 217 are shut down, the process ends. Otherwise, control passes to step 333 to determine if the token has expired. If so, control passes back to step 303, described above, to determine the next token for authorizing services through the gateway. If the token has not expired, then control passes back to step 323, described above, to accumulate any service input data.

FIG. 3B is a flowchart of process 350 for one step 325 of the process 300 depicted in FIG. 3A, according to one embodiment. In one embodiment, the gateway agent 257 performs the process 300 and is implemented in, for instance, a chip set including a processor and a memory as shown in FIG. 7 or mobile terminal as depicted in FIG. 8.

In step 351, battery consumption rates to obtain a service are determined based on the measure of service input data. For example, the battery drain experienced in past efforts to backup a megabyte of contact or content data is retrieved from a data structure. This test is done to ensure that the backup can complete before the current power supply is depleted and without compromising other functions of the UE 101. From a power consumption point of view, it is desirable to ensure that those operations associated with obtaining a service are not constant; and especially if those operations take long time, it is desirable to ensure there is enough power left for these operations to keep data integrity in all circumstance both in the device and also on the gateway side.

For example, in some embodiments, the gateway agent 257 includes a power agent module 256. The power agent module 256 earlier collected some information from previous operations, such as start and end time for operation, size of data uploaded/downloaded, battery level before the operation starts and battery level when the operation ends, and bearer used (WLAN, 3G, 3.5G, or 2G).

In step 353, a measure of the service input data is determined. For example, the number of bytes of contact or content data to be backed up is determined in step 353.

In step 355, it is determined whether a manual command has been issued to invoke the operator service. For example, it is determined whether a user has input a command to backup a particular file or group of files at a particular time. If so, then battery life is considered, as described below with respect to step 361 through step 365. Otherwise, control passes to step 357.

In step 357, it is determined if sufficient input data has been accumulated to invoke the service automatically. For example, it is determined if enough changes to automatically back up contacts data or content data have been accumulated to warrant backup, or if a scheduled backup time has been reached. If not, then, in step 359, it is determined that conditions are not satisfied to invoke the operator service, and control returns to step 323, as described above, to continue to accumulate service input data.

If it is determined, in step 357, that sufficient service input data has been accumulated, or if a manual command to invoke the service has been received in step 355, then control passes to step 361. In step 361 the current life of the battery is determined. For example the battery level is determined. Some service operations (such as backup of content including photographs, audio or video) might cause significant power consumption and cause breaks to the data integrity both in the device (e.g., UE 101) and backend (such as gateway service 150 or operator service 110, or both) if a connection is broken due to emptying the battery during the ongoing backend operation.

In step 363, it is determined whether a predetermined fraction of available battery life is sufficient to complete sending the service input data and responding to receiving notification of completion or failure. A fraction, rather than all, of the battery life is considered in order to leave sufficient power for other critical functions of the user equipment. For example, in some embodiments, the predetermined fraction is 10% of the available battery power. Thus, just before the operation to invoke the operator service is started, the power agent module 256 of gateway agent module 257 checks how long such an operation usually takes based on the amount of service input data accumulated. In the illustrated embodiment, these operations are allowed to increase the overall power consumption less than 10%. The power agent module 256 checks if similar size packages have been handled earlier. If yes, the power agent module 256 checks the battery levels (start and end of operation) for such earlier operations and compares that with 10% of the current available battery level. In some embodiments, how long the earlier operation has taken is also considered. Based on the similar earlier cases, time consumed and the current battery level, the power agent module 256 calculates the needed battery power for this operation. If there is enough power left, the power agent module 256 updates that it is allowed to queue this operation; and control passes to step 371 and following to perform the operation. In case a similar size package of accumulated input data was not experienced earlier, the determination is made based on the closest values, or interpolations thereof, and the current battery level.

Thus, in step 373, determining to send the first message further comprises determining to send the first message when a predetermined fraction of battery life at the user equipment is sufficient to send the first message.

If there is not enough power for such operation within the predetermined fraction, then, in step 365, the user is informed, e.g., using the same indication when the battery is empty, that the device needs to be charged. If the device is not connected to a charger in time, and the operation is still waiting, then it is determined in step 359 that conditions are not satisfied to invoke the operator service. In some embodiments, the operation is canceled and a new time for this operation is determined.

In some embodiments, such as embodiments in which the UE 101 does not rely on battery power but has an unlimited external power supply, steps 361 through 365 are omitted.

UE 101 originated operations, especially recurrent operations, might cause significant traffic load in the backend (even if load balancers are used for hosts of the gateway service 150) if those occur almost at or near the same time (e.g., at end of business in the same time zone). Steps 371 and 373 address the challenge of creating methods that decentralize the device originated operations so that those will not converge at the backend in a short time interval. Thus, in step 373, determining to send the first message further comprises determining to send the first message at a time after a random delay. Such steps are an example means to achieve the advantage of helping to prevent possible overload conditions at the backend.

In step 371, a random delay is determined. This is done in some embodiments to prevent the hosts for gateway service 150 from being deluged with requests from many user devices, such as UE 101, at popular times. A module inside the gateway agent module 257 called the decentralize agent module 258 is responsible for the random delay. In case of automatic operation on a particular schedule; the decentralize agent module 258 calculates a time when that operation should be started. In step 371, the decentralize agent module 258 calculates the start time for operation based on the current time, the device start time, and the random delay. In some embodiments' the random delay is determined to be within a configurable maximum delay (e.g. 24 hours or 30 minutes or 10 seconds). In some embodiments, there is also a minimum time between similar operations, e.g., between successive invocations of the operator backup and restore service. In some embodiments, the minimum time is also a configurable time (e.g. half hour). In such embodiments, the module 258 retains data that indicates when the previous operation took place, and may increase the random delay so that the next invocation of the service does not occur before the configured minimum time has passed.

In some embodiments, for manual invocation of the operator service, the decentralize agent module 258 uses shorter time periods to calculate the start time for the operation based on the current time and the random delay. For example, a predetermined maximum delay is shorter, such as one hour, and, in some embodiments, the minimum time between similar operations is also shorter. In some embodiments, to prevent user displeasure, the start time for operation is presented to the user during step 371, e.g., the text 'The contact backup operation will start at dd.mm.yyyy hh:mm:ss' is presented on a screen of UE 101, where dd.mm.yyyy indicates the day, month and year respectively, and hh:mm:ss indicates the hour, minute and second, respectively.

In step 373 it is determined whether the current time exceeds the random delayed time. If so, it is unlikely that device originated operations are started so closely in time on many user devices. Thereby such operations become sufficiently decentralized within a time zone to prevent overload in hosts of backend services. If not, then control passes back to step 357, described above to repeat testing conditions for stating the operation.

If it is determined, in step 373, that the current time exceeds the random delayed time, then in step 375 it is determined if a network connection is currently available. If not, control again passes back to step 357, described above. If a network connection is available, then in step 377 it is determined that conditions are satisfied to invoke the operator service; and control passes to step 327, described above with reference to FIG. 3A.

Figure 6:
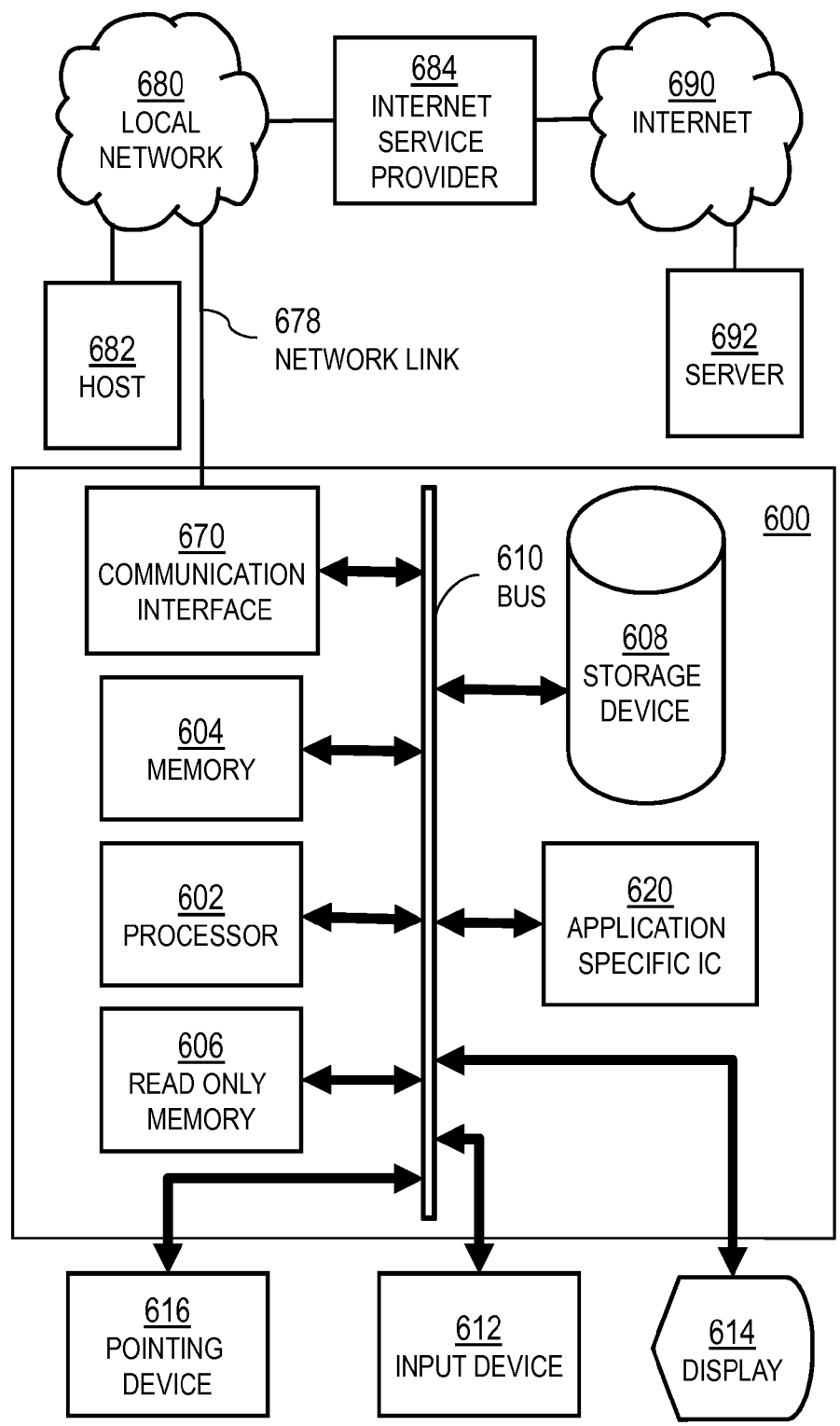
FIG. 6 is a diagram of hardware that can be used to implement an embodiment of the invention.

FIG. 4 is a flowchart of a process for a gateway to a network service with operator-specific interfaces, according to one embodiment. In one embodiment, one or more components of the gateway service 150 performs the process 300 and is implemented in, for instance, a chip set including a processor and a memory as shown in FIG. 7 or general purpose computer as depicted in FIG. 6. In some embodiments, the authentication service 140 performs one or more steps of the process 400.

In step 401, a message is received that indicates user data, operator data and an operator service, such as contact backup and restore. For example, a message from gateway client 257 directed to the API of contact backup module 252a is received, which indicates the token in field 286, the operator ID in field 292 and the country code in field 294. By virtue of directing the message to the API of contact backup module 252a, the operator service is indicated. Thus, step 401 includes receiving, at a first service, a first message for obtaining a second service with an operator-specific interface from an operator of a service associated with user equipment. The first message comprises operator data that indicates the operator. Recall, as the terms are used herein the first service (e.g., the service of the third party) is different from the second service (of the operator) and different from the user equipment.

In step 403, the gateway component returns any software updates for the operator service client 217, including any logos for the operator or specials or other advertisements for display in the user interface on UE 101. In some embodiments, the gateway agent 257 is implemented in a way that it is device platform (e.g., UE 101) agnostic and offers a consistent framework which enables the platform specific details to be hidden. In some embodiments, on the device side there is a third party notification client, as part of gateway agent 257, that sends/receives notifications from backend handled by a third party notification engine concerning changes to the backed up/restored data.

In some embodiments, for the authentication service 140, the token is not yet available, and other fields in the user data field 262 are filled. In some embodiments, for the authentication service 140, step 401 and step 403 are omitted.

In step 405, a message is received that indicates user data, operator data and operator service input data, such as contact data for contact backup and restore. For example, a message 260 from gateway client 257 directed to the API of contact backup module 252a is received, which indicates the token in field 286, the operator ID in field 292, the country code in field 294 and accumulated changes in contact data in field 266. By virtue of directing the message to the API of the contact backup module 252a, the operator service is indicated.

In authentication service 140, during step 405, a gateway message 260 is received with fields 272, 274, 276 and 278 filled in user data field 262 for SIM-based authentication; or with fields 282 and 284 filled otherwise. In both cases, the operator data field 264 is also included. The service input data 266 is omitted because the user data field 262 provides all the input involved for authentication.

Thus, step 405, like step 401, includes receiving, at a first service, a first message for obtaining a second service with an operator-specific interface from an operator of a service associated with user equipment. The first message comprises operator data that indicates the operator. Recall, as the terms are used herein, that the first service (e.g., the service of the third party) is different from the second service (of the operator) and different from the user equipment.

In step 407, operator-specific plug-ins are invoked based on the operator data to prepare operator-specific API inputs based on the service input data provided in field 266. Step 407 includes a call to the operator-specific API, e.g., operator service API 212. Thus, the third party gateway has a plug-in based approach that enables possible operator-specific adaptations. As a result, operators are able to use their own, and even some proprietary, protocol for the service, such as contact or content backup and restore. In that case, it is task for the operator-specific plug-in at third party gateway service 150 to map the message request/responses to the corresponding operator-specific requests/responses. These possible operator-specific protocols are totally invisible on device side, thus reducing the footprint on the UE 101. For example, using a generic contact backup, perhaps provided by the equipment manufacturer as the third party, the operator service client 217 collects the contact related data and involves the gateway agent module 257 to send the contacts related data using the generic API of contact backup module 252a eventually to the operator network API 212 via third party gateway service 150. The third party gateway service 150 recognizes, based on the given country code and operator code, the correct operator-specific plug-in and forwards the requests to that plug-in which reformats as needed for the operator service API 212.

Similarly, the gateway agent 257 in a content backup and restore client 217 sends the timelines and photos backup message using the API of content backup and restore module 252b towards operator network API 212 via third party gateway service 150; and is received during step 405. Again, using the country code and operator code parameters in fields 294 and 292, respectively, as the basis to recognize the corresponding operator, the gateway service 150, during step 407, passes the message towards corresponding operator plug-in that converts the data for the operator-specific API 212. Other operator service clients 217 and corresponding APIs of other operator services 252c are similarly engaged to provide other operator services with operator-specific API 212 while maintaining a small footprint on UE 101.

In authentication service 140, during step 407, using the country code and operator code parameters in fields 294 and 292, respectively, as a basis to recognize the corresponding operator, the gateway service 150, during step 407, passes the message towards corresponding operator plug-in which converts the data for the operator-specific authentication API 210.

Thus step 407 includes determining operator-specific data stored at the first service (of the third party) based, at least in part, on the operator data. In some embodiments, the operator-specific data further comprises instructions for steps to be performed by the first service (of the third party). Step 407 also includes determining to send, to the second service (of the operator), a service request message based, at least in part, on the operator-specific data. For a backup and restore operator service API 212, the second service is a backup or restore of user data. For the authentication operator service API 210, the second service is authentication. In authentication embodiments, the first message further indicates user data that indicates credentials of a user of the user equipment. In these embodiments, determining operator-specific data further comprises determining operator-specific user credentials for authentication by the operator based, at least in part, on the operator data and the user data. Furthermore, determining to send the service request message further comprises determining to send the service request message that indicates the operator-specific user credentials.

In step 409, operator specific plug-ins are invoked based on the operator data to prepare outputs for operator service client 217 based on operator-specific API outputs. The outputs are includes in a message to be sent to the gateway agent 257 for the operator service client 217. In some embodiments, a third party notification engine formats the message concerning changes to the backed up/restored data. In authentication service 140, a token is generated during step 409 based on a successful authentication message received from operator-specific authentication API 210. Thus, in authentication embodiments, the method further comprises determining to send, to the user equipment, token data that indicates authorization to obtain services, if the user is authenticated, and the first message received in step 405 further indicates the token data.

In step 411, the output message indicating the service provided is sent to the client 217 through the gateway agent. In some embodiments, the message is sent to the third party notification client, as part of gateway agent 257, which sends and receives notifications from the backend handled by the third party notification engine. In authentication service 140, the token is passed to the single sign on device enabler (SSO DE) in the authentication client 247.

In step 413, it is determined whether end conditions are satisfied. If so, the process ends. Otherwise control passes aback to step 401 to receive another message from the same or different client on the same or different user device.

Figure 5:
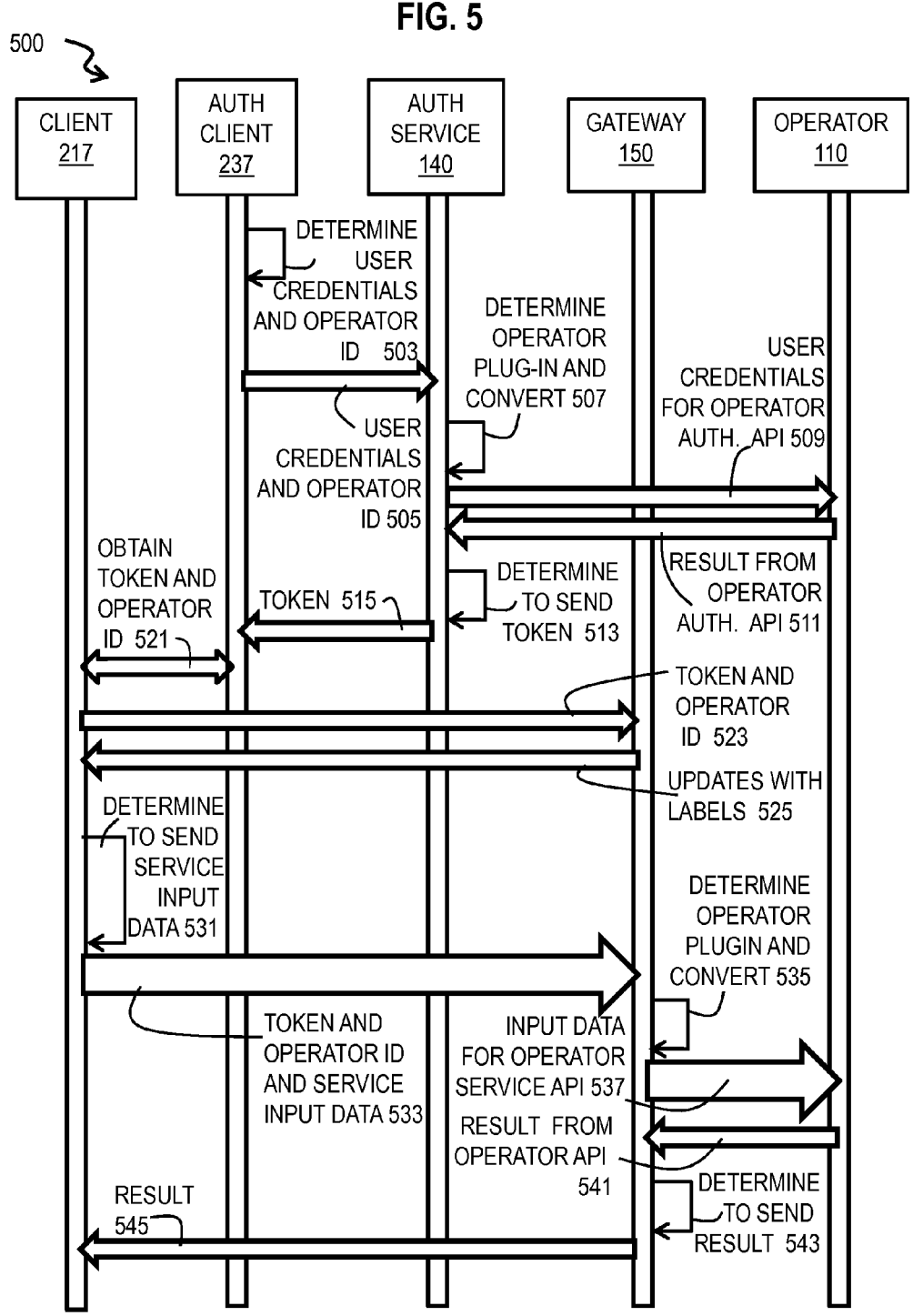
FIG. 5 is a time sequence diagram of messages exchanged between the client and gateway and operator service, according to an embodiment.

FIG. 5 is a time sequence diagram 500 of messages exchanged between the client 217 and gateway service 150 and operator service 110, according to an embodiment. In time sequence diagrams, time increases downward (not to scale), and an individual network process is represented by vertically elongated boxes labeled by rectangles at the top. A message sent from one process to another is indicated by a horizontal arrow pointing from the sending process to the receiving process. Actions performed at a single process is indicated by a segmented arrow looping back on the process at a vertical position indicative of the relative time when the step occurs. The processes represented in FIG. 5 include operator service client 217 (including gateway agent 257), authentication client 237, authentication service 140, gateway service 150 and operator service 110. The clients 217 and 237 reside on the user device, e.g., UE 101. The authentication service 140 and gateway service 150, and one or more other services 130, are provided by a third party (such as a user device manufacturer) different from the user and the operator.

During action 503, the authentication client 237 determines user credentials and operator ID, as described above with respect to step 301 through step 313. The user credentials and operator ID are send in one or more messages 505, such as in a gateway message 260 with the token field 286 empty and the service input data field 266 also empty.

During action 507, the operator-specific plug-in for authentication is determined based on the operator ID and used to convert the user credentials to a form appropriate for operator-specific authentication API 210, as described above for step 407. The converted user credentials are sent in one or more messages 509 to the operator authentication API 210. The authentication result in sent back in one or more messages 511.

If the authentication result indicates successful authentication, then during action 513 a token is generated for obtaining services for the user of client 217 from the third party for a predetermined time. The token is sent to the authentication client 237 in one or more messages 515.

When the client 217 is launched, the gateway agent 257 in client 217 obtains the token and the operator ID in one or more messages 521. The gateway agent 257 in client 217 then notifies the gateway service 150 of the launch in one or more messages 523 that indicate the token and the operator ID. For example, a gateway message 260 directed to the API of contact backup module 252a in gateway service 150 includes data that indicates the token in field 286 and data that indicates the operator ID in field 292 and country code in field 294. This message is sent during step 321 at the client and received during step 401 at the contact backup component of the gateway service 150

In one or more messages 525, updates with any labels are sent to the client 217 through the gateway agent module 257 during step 403 on the gateway service 150 and received during step 321 at the client 217. The software updates, if any, are installed, and the logos or other promotions or advertisements are presented at the user's device UE 101.

Action 531 determines to send service input data, as described above with respect to steps 323 through 327 of the client process 300 in FIG. 3A. Recall that step 325 includes the steps of FIG. 3B in some embodiments.

In one or more messages 533 the token and operator ID and service input data is sent from the gateway agent module 257 of client 217 to the corresponding component API of gateway service 150. Because the service input data can be voluminous, e.g., in the case of content backup, the messages 533 are depicted with an extra wide arrow. The action 531 includes determining to decentralize the messages 533 and ensure that battery life on the UE 101 is sufficient to complete the operation.

In action 535, the appropriate component of gateway service 150 determines the correct operator plug-in based on the operator ID and converts the service input data to the form for the operator-specific service API 212. The converted service input data is input to the operator service API 212 in one or more messages 537, as described above for step 407.

Notification of the result of the service is sent from the operator-specific service API in one or more messages 541, as described above for step 409. In action 541, the appropriate component of gateway service 150 uses the correct operator plug-in and converts the service output data from the operator-specific service API 212 to the form for the client 127, as described above for step 409. In step 411, one or more messages 545 with notification of the result of the service are sent to the client 217.

The illustrated embodiments help end users to backup their data to their operators' networks, with a small impact on the scarce resources of most mobile terminal. This service protects the users' data against loss due to a lost or changed mobile phone; and allows restoring the data from a previous phone to a new one (at least for the data that is still valid for the new phone). Users without a personal computer can also backup their personal data to the safe place. No operator-specific variants are needed on the user equipment for these backup and restore services. In the illustrated embodiments, all third party services can make use of the same authentication mechanism that is used by the operator. For example, the user can be offered a single sign on (SSO) experience for both third party services and operator services with minimal user intervention. In the illustrated embodiment, the user just types the PIN code, nothing else.

The processes described herein for small footprint clients for network services with operator-specific interfaces may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to support small footprint clients for network services with operator-specific interfaces as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of supporting small footprint clients for network services with operator-specific interfaces.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to supporting small footprint clients for network services with operator-specific interfaces. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for supporting small footprint clients for network services with operator-specific interfaces. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for supporting small footprint clients for network services with operator-specific interfaces, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, which carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for supporting small footprint clients for network services with operator-specific interfaces from the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to support small footprint clients for network services with operator-specific interfaces as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of supporting small footprint clients for network services with operator-specific interfaces.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to support small footprint clients for network services with operator-specific interfaces. The memory 705 also stores the data associated with or generated by the execution of the inventive steps.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of supporting small footprint clients for network services with operator-specific interfaces. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor (s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of supporting small footprint clients for network services with operator-specific interfaces. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to support small footprint clients for network services with operator-specific interfaces. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to obtain and/or process, at least in part, operator data that indicates at least one operator of a service associated with user equipment;
   determining to obtain and/or process, at least in part, user data that identifies at least one user of the user equipment for at least one gateway provider different from the at least one operator and different from the at least one user; and
   determining to send, to the at least one gateway provider, at least a first message that indicates the operator data and the user data for obtaining at least one service with an operator-specific interface,
   wherein determining to obtain and/or process the user data comprises:
   determining to send to the at least one gateway provider through the communications network at least one authentication message that indicates the operator data and local data; and
   receiving from the at least one gateway provider token data in response to the authentication message, wherein the token data indicates authorization to use at least one service at the gateway provider for a specified time, wherein the user data comprises the token data.

2. A method of claim 1, wherein the user equipment is a mobile terminal and the at least one operator of the at least one service associated with the user equipment is an operator of a communications network associated with the mobile terminal, and the at least one first message is sent through the communications network.

3. A method of claim 1, wherein:
   the operator data further comprises at least one country identifier and at least one operator identifier;
   the at least one country identifier indicates a country where the at least one operator provides a service for user equipments; and
   the at least one operator identifier uniquely identifies the at least one operator within the country.

4. A method of claim 1, wherein determining to send the at least one authentication message further comprises determining the local data based, at least in part, on data retrieved from at least one subscriber identity module at the user equipment.

5. A method of claim 1, wherein determining to send the at least one authentication message further comprises determining the local data based, at least in part, on data received at the user equipment as input from the at least one user of the user equipment.

6. A method of claim 1, wherein determining to send the at least one authentication message further comprises:
   determining whether authentication is based on data retrieved from at least one subscriber identity module at the user equipment; and
   if authentication is not based on data retrieved from the at least one subscriber identity module at the user equipment, then determining the local data based on at least one username and at least one password at least one of which is automatically generated at the user equipment.

7. A method of claim 6, wherein determining the local data based on the at least one username and the at least one password comprises:
   determining whether the at least one username and the at least one password are stored locally at the user equipment; and
   if the at least one username and the at least one password are not stored locally, then automatically generating at least one of the at least one username and the at least one password.

8. A method of claim 1, wherein determining to send the at least a first message further comprises determining to send the at least a first message at a time after at least one random delay.

9. A method of claim 1, wherein determining to send the at least a first message further comprises determining to send the at least a first message when a predetermined fraction of battery life at the user equipment is sufficient to send the at least one first message.

10. An apparatus comprising:
    at least one processor; and
    at least one memory including computer program code for one or more programs,
    the at least one memory and the computer program code configured to, with the at least one processor, cause the apparatus to perform at least the following,
    determine to obtain and/or process, at least in part, operator data that indicates at least one operator of a service associated with user equipment;
    determine to obtain and/or process, at least in part, user data that identifies at least one user of the user equipment for at least one gateway provider different from the at least one operator and different from the at least one user; and
    determine to send, to the at least one gateway provider, at least a first message that indicates the operator data and the user data for obtaining at least one service with an operator-specific interface,
wherein determine to obtain and/or process the user data comprises:
determine to send to the at least one gateway provider through the communications network at least one authentication message that indicates the operator data and local data;
receive from the at least one gateway provider token data in response to the authentication message, wherein the token data indicates authorization to use at least one service at the gateway provider for a specified time; and
the user data comprises the token data.

11. An apparatus of claim 10, wherein:
the operator data further comprises at least one country identifier and at least one operator identifier;
the at least one country identifier indicates a country where the at least one operator provides a service for user equipments; and
the at least one operator identifier uniquely identifies the at least one operator within the country.

12. An apparatus of claim 10, wherein to determine to send the at least one authentication message further comprises to determine the local data based, at least in part, on data retrieved from at least one subscriber identity module at the user equipment.

13. An apparatus of claim 10, wherein to determine to send the at least one authentication message further comprises to determine the local data based, at least in part, on data received at the user equipment as input from the at least one user of the user equipment.

14. An apparatus of claim 10, wherein to determine to send the at least one authentication message further comprises:
determining whether authentication is based on data retrieved from at least one subscriber identity module at the user equipment; and
if authentication is not based on data retrieved from the at least one subscriber identity module at the user equipment, then determine the local data based on at least one username and at least one password at least one of which is automatically generated at the user equipment.

15. An apparatus of claim 14, wherein to determine the local data based on the at least one username and the at least one password comprises:
determine whether the at least one username and the at least one password are stored locally at the user equipment; and
if the at least one username and the at least one password are not stored locally, then automatically generate at least one of the at least one username and the at least one password.

16. A method comprising:
facilitating a creation and/or a modification of at least one user device user interface element, at least one user device user interface functionality, or a combination thereof based, at least in part, on data and/or at least one signal resulting from:
a local and/or remote receiving, at a first service, a first message from the user device for obtaining for the user device at least one second service with an operator-specific interface, the first message being from at least one operator of a service associated with the user device,
wherein the first service is different from the at least one second service being obtained for the user device, and
wherein the first message comprises operator data that indicates the at least one operator;
a local and/or remote determining operator-specific data stored at the first service based, at least in part, on the operator data;
a local and/or remote determining to send, to the at least one second service at the user device, at least one service message based, at least in part, on the operator-specific data; and
converting at the first service, service output data for the second service at the user device to a form of the operator-specific interface of the second service at the user device.

17. A method of claim 16, wherein:
the first message further indicates user data that indicates credentials of at least one user of the user device;
determining operator-specific data further comprises determining operator-specific user credentials for authentication by the at least one operator based, at least in part, on the operator data and the user data; and
determining to send the at least one service request message further comprises determining to send the at least one service request message that indicates the operator-specific user credentials.

18. An apparatus comprising:
at least one processor; and
at least one memory including computer program code for one or more programs,
the at least one memory and the computer program code configured to, with the at least one processor, cause the apparatus to perform at least the following,
receiving, at a first service, a first message from user equipment for obtaining for the user equipment a second service with an operator-specific interface, the first message being from an operator of a service associated with the user equipment, wherein
the first service is different from the second service being obtained for the user equipment, and
the first message comprises operator data that indicates the operator,
determining operator-specific data stored at the first service based, at least in part, on the operator data; and
determining to send, to the second service at the user equipment, a service message based, at least in part, on the operator-specific data,
wherein the first service converts service output data for the second service at the user equipment to a form of the operator-specific interface of the second service at the user equipment.

* * * * *